(12) United States Patent
de Saint-Romain

(10) Patent No.: US 7,833,334 B2
(45) Date of Patent: Nov. 16, 2010

(54) INK COMPOSITION FOR CONTINUOUS DEVIATED JET PRINTING

(75) Inventor: Pierre de Saint-Romain, Valence (FR)

(73) Assignee: Marken-Imaje, Bourg-les-Valence (FR)

( * ) Notice: Subject to any disclaimer, the term of this patent is extended or adjusted under 35 U.S.C. 154(b) by 573 days.

(21) Appl. No.: 11/378,041

(22) Filed: Mar. 17, 2006

(65) Prior Publication Data
US 2007/0248838 A1    Oct. 25, 2007

(30) Foreign Application Priority Data
Mar. 18, 2005    (FR) .................................. 05 50699

(51) Int. Cl.
*C09D 11/00*    (2006.01)
(52) U.S. Cl. ................ 106/31.13; 106/31.27; 106/31.6; 106/31.58; 106/31.86
(58) Field of Classification Search ............. 106/31.13, 106/31.27, 31.6, 31.58, 31.86
See application file for complete search history.

(56) References Cited

U.S. PATENT DOCUMENTS

| | | | |
|---|---|---|---|
| 3,994,736 A | 11/1976 | Hertz et al. | |
| 4,024,096 A | 5/1977 | Wachtel | |
| 4,070,322 A | 1/1978 | Hwang et al. | |
| 4,153,593 A | 5/1979 | Zabiak et al. | |
| 4,155,767 A | 5/1979 | Specht et al. | |
| 4,155,895 A | 5/1979 | Rohowetz et al. | |
| 4,166,044 A | 8/1979 | Germonprez et al. | |
| 4,210,566 A | 7/1980 | Murray | |
| 4,260,531 A | 4/1981 | Wachtel et al. | |
| 4,465,800 A | 8/1984 | Bhatia | |
| 4,567,213 A | 1/1986 | Bhatia et al. | |
| 4,680,058 A | 7/1987 | Shimizu et al. | |
| 4,756,758 A | 7/1988 | Lent et al. | |
| 4,834,799 A | 5/1989 | Song | |
| 4,880,465 A | 11/1989 | Loria et al. | |
| 5,102,458 A | 4/1992 | Lent et al. | |
| 5,270,368 A | 12/1993 | Lent et al. | |
| 5,316,575 A | 5/1994 | Lent et al. | |
| 5,395,431 A | 3/1995 | Siddiqui et al. | |
| 5,395,432 A | 3/1995 | Nelson et al. | |
| 5,443,628 A | 8/1995 | Loria et al. | |
| 5,594,044 A | 1/1997 | Yang | |
| 5,637,139 A | 6/1997 | Morelos et al. | |
| 5,693,127 A | 12/1997 | Nigam et al. | |
| 5,755,860 A | 5/1998 | Zhu | |
| 5,800,601 A | 9/1998 | Zou et al. | |
| 6,251,175 B1 | 6/2001 | Zhu et al. | |
| 6,764,540 B2 * | 7/2004 | Taguchi ................... | 106/31.27 |
| 6,869,986 B1 | 3/2005 | Millot et al. | |
| 2002/0144626 A1 | 10/2002 | Schut | |
| 2002/0155224 A1* | 10/2002 | Schmidt et al. ............. | 427/337 |
| 2004/0106699 A1* | 6/2004 | Ishikawa et al. ............ | 523/160 |

FOREIGN PATENT DOCUMENTS

| | | |
|---|---|---|
| EP | 0034881 A1 | 9/1981 |
| EP | 0237788 A2 | 9/1987 |
| EP | 0289141 A2 | 11/1988 |
| EP | 0465039 A1 | 1/1992 |
| EP | 0510752 A1 | 10/1992 |
| EP | 0735120 A2 | 10/1996 |
| FR | 2460982 | 1/1981 |
| FR | 2796959 A1 | 2/2002 |
| GB | 2277094 A | 10/1994 |
| GB | 2286402 A | 8/1995 |
| GB | 2298713 A | 9/1996 |
| JP | 52-148307 A | 12/1977 |
| WO | WO 92/14794 | 9/1992 |
| WO | WO 92/14795 | 9/1992 |
| WO | WO 96/23844 | 8/1996 |
| WO | WO 97/10307 | 3/1997 |
| WO | WO 95/29287 | 11/1997 |
| WO | WO 00/22055 | 4/2000 |
| WO | WO 00/63305 | 10/2000 |

* cited by examiner

*Primary Examiner*—Jerry Lorengo
*Assistant Examiner*—Veronica Faison Gee
(74) *Attorney, Agent, or Firm*—Pearne & Gordon LLP

(57) ABSTRACT

Ink composition for continuous deviated jet printing, which is liquid at ambient temperature, comprising:
  a)—a solvent, representing at least 10% of the total weight of the ink composition;
  b)—at least one compound that can be dissociated into at least one anion and at least one cation, said compound representing at least 0.1%, preferably from 0.1% to 20%, more preferably from 0.1% to 10%, better still from 0.1% to 5% by weight of the total weight of the ink composition;
  c)—at least one compound that complexes said cation or said anion, representing at least 0.1% by weight of the total weight of the ink composition.

Process for marking objects using this ink and substrate provided with marking obtained by drying the ink composition.

37 Claims, No Drawings

INK COMPOSITION FOR CONTINUOUS DEVIATED JET PRINTING

TECHNICAL FIELD

The invention relates to an ink composition for marking supports and objects of all types, the properties of which are particularly suitable for liquid jet printing or marking, and most particularly for the continuous deviated inkjet marking of a very large variety of supports, which may be both porous and nonporous.

Inkjet printing is a well known technique, which allows the printing, the marking or the decoration of objects of all types, at high speed, and without these objects coming into contact with the printing device, with variable messages as desired, such as barcodes, sell-by dates, etc., even on nonplanar supports.

Inkjet printing systems can be divided up into two main types: "drop on demand" (DOD) or "continuous jet" (CJ).

We are interested more particularly in the latter technique, more specifically in the continuous deviated jet technique.

Continuous deviated jet spraying consists in sending ink, under pressure, into a cavity containing a piezoelectric crystal, from where the ink escapes via an orifice (nozzle) in the form of a jet. The piezoelectric crystal, vibrating at a given frequency, causes pressure disturbances in the inkjet, which oscillates and gradually breaks up into spherical droplets. An electrode, placed on the path of the jet, where it breaks up, makes it possible to give these drops an electrostatic charge, if the ink is conductive. The drops thus charged are deflected in an electric field and allow the printing. The drops which are not charged, and therefore not deflected, are recovered in a drop collector, where the ink is withdrawn by suction and then recycled to the ink circuit.

This type of inkjet spraying provides no-contact marking at high throughput speed on objects that are not necessarily planar and with the possibility of changing the message at will. The technique is particularly suitable for the marking and identification (expiration dates, serial numbers, batch numbers, barcodes, etc.) of industrial products on production lines.

The field of application described requires varied ink formulations suitable for the variety of substrates to be marked (metal, plastics, glass, etc.) and satisfying a very large variety of industrial constraints.

Ink compositions suitable for continuous deviated jet spraying must satisfy a certain number of criteria inherent in this technique, relating, among others, to viscosity, electroconductivity, solubility in a solvent for cleaning, ingredient compatibility, correct wetting of the supports to be marked, etc.

Furthermore, these inks must dry rapidly, and must be capable of passing through the nozzle without blocking it, with a high stability of orientation of the jet while at the same time allowing easy cleaning of the printing head.

The ingredients which make up current inks for inkjet of the continuous deviated jet type are organic or mineral products; they are dyestuffs, such as dyes or pigments, resins or binders, in one or more solvent(s) that is (are) more or less volatile, or in water, and optionally one or more conductivity salts(s), and also various additives.

The dyestuffs are called "dyes or pigments", depending on whether they are respectively soluble or insoluble in the solvent used.

The pigments, which are by nature insoluble, are therefore dispersed and can be opaque or nonopaque. They give the ink its color, its opacity, or specific optical properties, such as fluorescence (cf. patents or patent applications U.S. Pat. No. 4,153,593, U.S. Pat. No. 4,756,758, U.S. Pat. No. 4,880,465, EP-A-0 289 141, U.S. Pat. No. 5,395,432, GB-A-2 298 713). In certain cases, the dyes themselves also give the ink sufficient conductivity for it not to be necessary to add a conductivity salt. The dyes known under the name C. I. Solvent Black 27, 29, 35 and 45 are included in this case.

The binder(s) or resin(s) is (are) generally, mostly, one (or more) solid and polymeric compound(s) and the choice thereof is dictated by their solubility in the selected solvents and by their compatibility with the dyes and the other additives, but also and especially according to the properties that they give the film of ink, once dried (see patents or patent applications U.S. Pat. No. 4,834,799, GB-A-2 286 402, U.S. Pat. No. 5,594,044, U.S. Pat. No. 5,316,575, WO-A-96/23844, WO-A-95/29 287).

Their primary function is to provide the ink with adhesion to the maximum number of supports or to specific supports, for example nonporous supports. They also make it possible to give the ink the appropriate viscosity for the formation of the drops from the jet and they provide the ink, or rather the marking obtained, with most of its properties of resistance to physical and/or chemical attacks.

The additives comprise dispersants which allow the dispersion of the pigments, surfactants which modify the wetting or penetrating capacity of the ink (U.S. Pat. No. 5,395,431), in particular those which modify or regulate the static or dynamic surface tension, such as Fluorad® FC 430 from the company 3M®, agents which inhibit the corrosion induced by the salts which provide the conductivity (see documents EP-A-0 510 752, U.S. Pat. No. 5,102,458), or else additives which protect the ink against the proliferation of bacteria and of other microorganisms: these are biocides, bactericides, fungicides and the like, which are particularly useful in inks containing water, pH regulating buffers (see EP-A-0 735 120), and antifoaming agents.

The optional conductivity salt(s) provide(s) the ink with the conductivity required for the electrostatic deviation. In this respect, reference may be made to document U.S. Pat. No. 4,465,800.

Among the salts which provide the conductivity, use is made of all types of species that are ionizable, soluble and dissociable in the solvent medium of the ink.

For inks where the predominant solvent is water, providing the ink with conductivity does not generally pose a problem, since most water-soluble products are ionizable species.

However, the aqueous medium does not allow a large variety of formulations, since the solvent capacity of water is limited, and the rate of evaporation of water is too slow to be able to take advantage of the possibilities of high speed printing that inkjet allows. Furthermore, the variety of organic solvents with a high dissolving capacity for polymers and dyes makes it possible to formulate inks that dry rapidly and have excellent adhesion to substrates of all types.

On the other hand, in these organic media, conductivity is only possible when the solvents are sufficiently dissociating, i.e. when their dielectric permittivity and their dipolar moment are sufficiently high. When this is the case, it is necessary to find a salt whose cation and anion are sufficiently soluble in the medium.

A large amount of relatively non-conductive salt can negatively affect the functioning of the printer due to blocking of the nozzle during the stop phase (cf. EP-A-0 850 281, page 8, line 21) due to the tendency of these salts to crystallize when the concentration thereof is too close to their solubility limit.

Among the salts commonly used are found those whose cation is an alkali metal such lithium, sodium or potassium (U.S. Pat. No. 3,994,736), or an alkaline earth metal (U.S. Pat. No. 4,070,322, U.S. Pat. No. 4,680,058); ammonium salts, tetraalkylammonium salts, for example tetrabutylammonium salts (WO-A-00/63305), hydroxylamine salts, dimethylamine salts (U.S. Pat. No. 4,465,800), diethylamine salts or morpholine salts (U.S. Pat. No. 4,155,767), tetraalkylphosphonium salts (U.S. Pat. No. 5,755,860); or else the chromophore component of basic dyes (EP-A-0 034 881); and certain amine salts (U.S. Pat. No. 4,567,213).

Among the various types of anions are mentioned halides, such as chlorides, bromides (U.S. Pat. No. 5,693,127) or iodides (U.S. Pat. No. 5,637,139); nitrates; thiocyanates (U.S. Pat. No. 4,024,096); formates; acetates; propionates; sulfonates, such as para-toluenesulfonates (EP-A-0 034 881) or trifluoromethanesulfonates (U.S. Pat. No. 6,251,175); tetrafluoroborates (WO-A-00/63305); bicarbonates; citrates; lactates and alginates (U.S. Pat. No. 5,800,601), hydroxides (WO-A-00/22055); sulfates; phosphates (U.S. Pat. No. 5,443,628); hexafluorophosphates; and hexafluoroantimonates.

The choice of salts is guided by:
  their ability to provide the ink with conductivity at the lowest possible level;
  their solubility;
  their corrosiveness on the metals constituting the printers;
  their compatibility/chemical inertia with respect to the other components of the ink (see EP-A-0 465 039);
  their volatility;
  their water-solubility, which may be desirable or harmful depending on the case, for example for the water-resistance of the ink;
  their cost per unit of conductivity provided.

Most of the salts mentioned above have a certain number of drawbacks, thus:
  the halides, fluorides, chlorides and, to a lesser degree, bromides and iodides, have a very pronounced corrosive nature, to the point that anticorrosive additives are necessary in order to limit the effect thereof. Secondary amines have been claimed in patent U.S. Pat. No. 5,102,458 (EP-A-0 510 752), and dinonylnaphthalene sulfonates have been mentioned in document U.S. Pat. No. 5,270,368, in order to limit the corrosion;
  salts that are sufficiently soluble in the least polar solvents, such as ketones, are rare;
  not all the possible salts are compatible with all the ingredients of the inks, in particular inorganic cations such as Na, K, Li or Mg, the mineral nature of which does not go well with organic resins;
  salts that are too water-soluble make the inks too hydrophilic and reduce the water resistance of the inks;
  certain cations, such as the ammonium ion, are volatile and gradually disappear during the recirculation of the ink in continuous jet-type printers. The same is true of certain acetates and formates;
  cations of tetraalkylammonium type have a large molecular mass and, as a result, a relatively low effectiveness per unit mass. Those whose molecular mass is the lowest are difficult to solubilize in ketones, and very expensive;
  even though some salts are highly dissociated in the medium, their solubility limit may be low and the risks of precipitation high;
  amines such as those which are added so as to limit the corrosion caused by certain salts are products which react slowly with ketones and are therefore destroyed. They cannot be used in ketone solvent-based ink formulations without risks of parasitic reactions;
  inorganic salts, which are in general readily dissociable, are not very compatible with binders and other organic ingredients.

The solvent for these inks most commonly consists of a mixture comprising, firstly, a predominant amount of volatile and relatively nonviscous solvents, in order to allow very fast drying of the markings and to adjust the viscosity to the desired value, for example from 2 to 10 mPa·s, and, secondly, a lesser amount of solvents that are more viscous and less volatile and that dry more slowly, so as to avoid drying of the ink in the nozzle during the stop phases of the printing device (cf. patents or patent applications U.S. Pat. No. 4,155,767, WO-A-92 14794, WO-A-92 14 795 and U.S. Pat. No. 4,260,531).

The volatile solvents most commonly used are alcohols, ketones or esters of low molecular weight, as indicated in patents U.S. Pat. No. 4,567,213 and U.S. Pat. No. 5,637,139. Among these solvents, mention may essentially be made of methanol, ethanol, 1- and 2-propanol, acetone, methyl ethyl ketone (MEK) and methyl isobutyl ketone.

The less volatile solvents that have in particular a function of delaying drying are most commonly ketones, such as cyclohexanone, glycol ethers, mentioned in documents U.S. Pat. No. 4,024,096 and U.S. Pat. No. 4,567,213, ethers and acetals, such as furan or dioxane, mentioned in document U.S. Pat. No. 4,155,767, dimethylformamide or dimethyl sulfoxide (U.S. Pat. No. 4,155,895), lactones (EP-A-0 034 881), N-methyl-pyrrolidone (EP-A-0 735 120), glycols (WO-A-96 23 844), and even aliphatic hydrocarbons (U.S. Pat. No. 4,166,044) or else water, alone or in combination with other solvents, mentioned above, reference will, in this respect, be made to documents U.S. Pat. No. 4,153,593, GB-A-2 277 094 and FR-A-2 460 982.

In general, main or predominant solvents for the inks for continuous deviated jet spraying must meet a certain number of criteria, in particular:
  their volatility must be sufficient for the ink to dry rapidly on the support to be marked, but not too great, so as not to evaporate too quickly in the printer, in particular during the stop phases;
  their solvent capacity, with respect to the binders of the ink, to the dyes or to the pigmentary dispersions and with respect to the supports to be printed, must make it possible to confer good adhesion on the dry ink;
  their effect on the health of individuals, i.e. their toxicity, noxiousness, irritant nature and inflammability must be low;
  they must make it possible to maintain sterile an ink optionally intended to be ingested;
  finally, and this is an essential criterion that the predominant or main solvents (and also the minority solvents, to a lesser extent) must satisfy, they must have the ability to maintain dissociated ionic species such as the salts which confer on the ink its electrical conductivity.

In order to satisfy this important last criterion, all the solvents (predominant solvents cited above) are polar solvents that are dissociating with respect to ionic species such as salts, and, in particular the dielectric constant of these solvents is greater than or equal to 15.

When non-dissociating solvents are predominantly used, they are never used alone but in combination with another highly dissociating solvent. Thus, patent U.S. Pat. No. 4,210,566 provides an ink based predominantly on n-propyl acetate, but also containing a solvent such as methyl cellosolve, dimethylformamide, 2,4-pentanedione and an alcohol, which are all solvents that are highly dissociating with respect to salts.

n-Propyl acetate in fact has a dielectric constant of 6.3, whereas methyl cellosolve, dimethyl-formamide and 2,4-pentanedione have dielectric constants of 16, 36.7 and 25, respectively.

The ink formulations for continuous deviated inkjet are therefore limited to the use of solvents that are highly dissociating with respect to ionic species and which therefore have dielectric constants greater than approximately 15.

The most dissociating solvents commonly used in these ink formulations are:

water (having a dielectric constant of 78), but its very low rate of evaporation limits its use to printing on porous supports;

alcohols such as:
  methanol (having a dielectric constant of 32.6), but its high toxicity and its poor solvent capacity for binders are considerable limits,
  ethanol (having a dielectric constant of 24.3), but its denaturation is an administrative constraint in all countries; in addition, it is not sufficiently volatile and its solvent capacity for binders is not great enough;

ketones such as:
  methyl ethyl ketone (MEK) (having a dielectric constant of 18.5), but it is irritant, odorous—its odor makes it less and less acceptable to users—and inflammable with a flashpoint of −9° C., furthermore, it is even banned by the regulations in certain countries;
  acetone (having a dielectric constant of 20.7) is very volatile with a very low flashpoint (−18° C.) and inflammable, and can only reasonably be used in cold surroundings;

the other alcohols or ketones of higher molecular mass that satisfy the conditions of a dielectric constant greater than 15 are less volatile and limit their uses to applications where the rate of evaporation of the ink may be low.

It emerges from the above that none of the solvents, referred to as main or predominant, currently commonly used in inks for continuous jet printing simultaneously satisfy all the criteria mentioned above.

In particular, none of the solvents that satisfy the imperative condition relating to the ability to dissociate ionic species, expressed by means of a dielectric constant greater than 15, also satisfies all the other criteria stated above.

The obligation for the solvent to necessarily satisfy the criterion regarding the dissociating nature greatly limits the choice of possible solvents in ink compositions for continuous deviated jet printing and in fact results, by default, in the use of solvents for which many other properties are not satisfactory.

Similarly, other solvents whose dissociating capacity is too low from the viewpoint of their relatively low dielectric constant, and which would satisfy the other requirements, for example in terms of solubility and of solvent capacity with regard to the binders, cannot be used in ink compositions for continuous deviated jet printing.

There exists therefore an unmet need for a suitable ink composition, in particular for continuous deviated jet printing, in which it is possible to use a large variety of solvents in order to simultaneously obtain the desired electrical conductivity and all the other desired properties, while the requirements, in particular regulatory requirements, in terms of toxicity, inflammability and environmental protection are satisfied.

It would also be advantageous to have an ink composition in which, the condition of conductivity being satisfied, a very large number of solvents can be used so that the properties of the ink in relation to the properties of these solvents, such as the volatility and the solvent capacity with respect to the binders, can be adjusted as desired, without limitation.

It would also be advantageous to have a solvent which makes it possible to dissolve the dyes and other ingredients that are insufficiently soluble in the usual solvents mentioned above and which can confer novel properties on the ink.

There still exists a need for an ink suitable in particular for continuous deviated inkjet printing, which allows rapid marking of all types of objects with different surface characteristics, both porous and nonporous.

The ink must also give marking that exhibits good adhesion and good resistance to chemical attacks and, in general, must exhibit all the properties usually required of inks for inkjet printers, in particular for printers using the continuous jet technique: viscosity, resistivity, etc.

The ink must also allow high speed marking of objects that are even weakly porous, always giving a printing of excellent quality.

The aim of the invention is therefore to provide an ink composition suitable, in particular, for continuous deviated jet printing, which satisfies, inter alia, all the needs indicated above, which satisfies the criteria and requirements mentioned above, which does not have the drawbacks, limitations, faults and disadvantages of the ink compositions of the prior art, and which overcomes the problems of the compositions of the prior art associated, in particular, with the nature of the solvent that they contain.

This aim and others are achieved, in accordance with the invention, by means of an ink composition for continuous deviated jet printing, which is liquid at ambient temperature, comprising:

a)—a solvent comprising a majority, as % by weight, relative to the total weight of the solvent, of one or more solvent compound(s), the dielectric constant of which is less than 15, said solvent representing at least 10% of the total weight of the ink composition;

b)—at least one noncolored compound which can be dissociated into at least one anion and at least one cation, said compound representing at least 0.1%, preferably from 0.1% to 20%, more preferably from 0.1% to 10%, better still from 0.1% to 5% by weight of the total weight of the ink composition;

c)—at least one compound that complexes said cation or said anion, representing at least 0.1% by weight of the total weight of the ink composition.

The term "ambient temperature" is generally intended to mean a temperature of from 5 to 30° C., preferably of from 10 to 25° C., more preferably of from 15 to 24° C., better still of from 20 to 23° C. It is clearly understood that the ink is liquid at atmospheric pressure.

Advantageously, said at least one noncolored compound that can be dissociated into at least one cation and at least one anion is chosen from conductivity salts.

Advantageously, the ink composition can also comprise:
  d) one or more dyes and/or pigments,
  e) a binder.

Said dye(s) and/or pigment(s) can be chosen from dyes and/or pigments that can be dissociated into at least one anion and at least one cation; and/or dyes and/or pigments that cannot be dissociated into at least one anion and at least one cation.

Preferably, the ink composition according to the invention comprises at least one dye and/or pigment that can be dissociated into at least one anion and at least one cation and, optionally, a dye and/or a pigment that cannot be dissociated into at least one anion and at least one cation.

Advantageously, said complexing compound is chosen from compounds that complex cations, such as polyethylene glycol dimethyl ethers, also called glymes, propylene glycol dimethyl ethers and polypropylene glycol dimethyl ethers, crown ethers, lariats, cryptands, spherands, hemispherands, cyclo-dextrins, and mixtures thereof.

The ink composition according to the invention differs fundamentally from the ink compositions of the prior art in that it contains at least one complexing compound, preferably a compound that complexes cations, in a proportion of at least 0.10% by weight of the total weight of the composition.

The incorporation of such complexing compounds into ink compositions, in particular into ink compositions for continuous deviated jet printing, is neither described nor suggested in the prior art.

The complexing compounds are known compounds which are used in particular for complexing certain ions used mainly as a phase transfer catalyst in organic chemistry. This is a field very distant from that of ink compositions.

Surprisingly, according to the invention, it has been noted that the compounds, in particular noncolored compounds, that can be dissociated into at least one cation and at least one anion—compounds which are generally called salts—that are in the ink composition have an increased solubility in the presence of complexing compounds. In particular, entirely unexpectedly, salts such as lithium salts, sodium salts and potassium salts, which are only slightly soluble in certain solvent compounds of low dielectric constant—i.e. generally less than approximately 15—have a very increased solubility in the presence of these complexing compounds.

Said complexing compounds contribute, entirely surprisingly, to increasing the conductivity of inks that can be sprayed by inkjet of the continuous deviated type, even in solvent compounds reputed to be nondissociating the dielectric constant of which is less than approximately 15.

The incorporation of complexing compounds into the ink compositions according to the invention makes it possible, for the choice of solvent compounds of these ink compositions, to be rid of the constraint imposed with respect to their dielectric constant of less than 15.

As a result, the solvent compounds included in the ink compositions according to the invention can be chosen, without limit, from all the available solvent compounds, which makes it possible to obtain, for the ink, optimal property combinations which it was not possible to obtain up until now with the inks of the prior art in which only a very limited number of solvent compounds could be used. For example, it is possible, without being hampered by the constraint of a high dissociating capacity with respect to salts, to choose the solvents in order to introduce one or more advantageous properties such as volatility, and solvent capacity with respect to binders.

In other words, the incorporation of complexing compounds into the inks according to the invention makes it possible to formulate inks with solvent compounds that are infinitely more varied than those used up until now, which allows the person formulating the ink to have a virtually infinite choice among the solvent compounds in order to provide the ink with all the desired properties without any constraint limiting this choice.

It should be noted that the increase in the salt solubility and in the conductivity of the ink due to the complexing agents incorporated into the ink compositions according to the invention is absolutely not limited to dissociating solvent compounds but, on the contrary, can be applied generally.

These increases in solubility and in conductivity are also in fact observed in dissociating solvents such as, for example, methyl ethyl ketone, but generally with relatively less of an increase.

The term "complexing compound" is a term well known to those skilled in the art and will not be defined more specifically. The term "complexing compound" also includes compounds referred to as sequestering agents, ligands or chelating agents.

The complexing compound is generally chosen from polyethylene glycol dimethyl ether, also called glymes, propylene glycol dimethyl ethers and polypropylene glycol dimethyl ethers, crown ethers, lariats, cryptands, spherands, hemispherands, cyclo-dextrins, and mixtures thereof.

Among the glymes, the lowest molecular weight ethers are noxious or even toxic products, such as ethylene glycol dimethyl ether. They are therefore preferably to be prohibited for the obvious reason of protection of users.

Glymes based on tetraethylene glycol are relatively nonvolatile solvents that are neither noxious nor irritant. Glymes having a mass greater than or equal to that of tetraglyme (tetraethylene glycol dimethyl ether) will therefore preferably be used.

Among propylene glycol dimethyl ethers and polypropylene glycol dimethyl ethers, ethers having a molecular mass greater than or equal to that of tetrapropylene glycol are preferably chosen.

Crown ethers are cyclic compounds which generally comprise series of $CH_2$—$CH_2$—O groups.

Crown ether nomenclature corresponds to the following rules:

Written between square brackets is the total number of atoms which form the ring (excluding additional groups) followed by the ether name (or crown). The number of oxygen or nitrogen atoms which are elements of this ring are subsequently defined. The peripheral groups and the atoms which substitute for the initial oxygens of the ring are placed in front.

Crown ethers and the complex thereof are also called, respectively, coronands and coronates.

The crown ethers which are included in the ink composition according to the invention are generally chosen from 1,4,7,10-tetraoxacyclododecane, also called 12-crown-4, 1,4,7,10,13-pentaoxacyclopenta-decane or 15-crown-5, 1,4,7,10,13,16-hexaoxacycloocta-decane or 18-crown-6, benzo-12-crown-4, benzo-15-crown-5, benzo-18-crown-6, polydibenzo-18-crown-6, cyclo-hexano-15-crown-5, cyclo-hexano-18-crown-6, dibenzo-15-crown-5, dibenzo-18-crown-6, dibenzo-21-crown-7, dibenzo-24-crown-8, dibenzo-30-crown-10, dicyclohexano-18-crown-6, 2-hydroxymethyl-12-crown-4, 2-hydroxy-methyl-15-crown-5, 2-hydroxymethyl-18-crown-6, 7,16-di-benzyl-1,4,10,13-tetraoxa-7,16-diazacyclooctadecane, 1,4,10-trioxa-7,13-diazacyclopentadecane, 4'-amino-benzo-15-crown-5, 4'-aminobenzo-18-crown-6, 4'-amino-dibenzo-18-crown-6, 2-aminomethyl-15-crown-5, 2-amino-methyl-18-crown-6, 4'-amino-5'-nitrobenzo-15-crown-5, 1-aza-12-crown-4, and mixtures thereof.

Lariats are derivatives of crown ethers in which one (in the case of a one-armed lariat) or two (in the case of a two-armed lariat) of the oxygens of the ring have been replaced with nitrogen atoms from which "a rope" (lariat comes from "rope" and from "tie") rises above the ring. This arm is a chemical group which can contain one or more atoms capable of increasing the ion complexation index Cryptands are molecules formed from three chains, connected to one another by two nitrogen atoms at their ends.

This structure allows real three-dimensional stabilization of the cation, which is completely isolated.

Cryptand nomenclature is different from that of crown ethers due to the fact that the number of atoms capable of stabilizing an ion, of each chain, is described between square brackets, separated by periods. The cryptand name follows the square brackets. It should be noted that the name cryptate has been proposed for the complexes of which they form the basis.

The cryptands also include ditropic cryptands, which are molecules formed from two crowns connected to one another by two bridges. These ligands are capable of complexing two cations by virtue of their two crowns.

Spherands are compounds that are structurally similar to crown ethers but that do not have the same malleability properties; on the contrary, they show very great rigidity due to the methoxy groups.

Hemispherands are related to spherands but have half as many methoxy groups, hence they are less rigid than spherands.

The cryptands are preferably chosen from 4,7,13,16,21,24-hexaoxa-1,10-diazabicyclo[8.8.8]hexacosane, also called Cryptand 222, 4,7,13,16,21-pentaoxa-1,10-diazabicyclo[8.8.5]tricosane, also called Cryptand 221, 4,7,13,18-tetraoxa-1,10-diazabicyclo-[8.5.5]eicosane, also called Cryptand 211, and mixtures thereof.

The cyclodextrins are preferably chosen from α-, β- or γ-cyclodextrins, derivatives thereof and mixtures thereof.

Cyclodextrins are cyclic polyglucoses formed from the assembly of glucose units. α-Cyclodextrin consists of 6 glucose units, β-cyclodextrin consisting of 7 units and γ-cyclodextrin consisting of 8 units. They are produced by the action of a specific enzyme on starch.

They are characterized by a structure "in the form of a crown" exhibiting:
on the outside, hydroxyls conferring a hydrophilic nature, and on the inside, a hydrophobic cavity.

Unlike the compositions of the prior art, the ink composition according to the invention contains a very small amount of water, generally less than 10% by weight, preferably less than 5%, more preferably less than 1% by weight relative to the total weight of the ink.

The ink composition according to the invention can even be considered to be essentially free of water (0% water).

In fact, the water present is merely the water introduced as an impurity in the various components of the ink. The greater the degree of purity of the components chosen, the lower the water content.

The low content or absence of water in the ink composition according to the invention promotes the formation of the film of ink when the binders and other dyes of the composition are water-insoluble, thus improving the properties of resistance and of adhesion of the ink.

In the composition according to the invention, the solvent generally represents at least 10% by weight of the total weight of the ink composition, preferably the solvent represents from 30 to 90% by weight, more preferably from 60 to 80% by weight of the total weight of the ink composition.

The solvent comprises one or more organic solvent compound(s) and, optionally, water, on the condition that the amount of water obeys the conditions indicated above.

By virtue of the presence in the ink composition according to the invention of a complexing agent, preferably an agent that complexes cations, there is no limitation on the nature of the solvent compound(s) that can be used. Any solvent compound can be used, whatever its dissociating capacity with respect to ion pairs, on condition that the solvent comprises a majority, as % by weight, relative to the total weight of the solvent, of one or more solvent compound(s), the dielectric constant of which is less than 15.

Said organic solvent compound(s) forming part of the solvent is (are) chosen, for example, from alcohols, in particular low molecular weight alcohols, for example aliphatic alcohols; ketones, preferably low molecular weight ketones; alkylene glycol ethers; alkylene glycol esters and alkylene glycol ether esters, such as acetates; dimethylformamide; N-methylpyrrolidone; acetals; esters; linear or cyclic ethers; cyclic or noncyclic, aliphatic hydrocarbons, for example linear or branched hydrocarbons; aromatic or nonaromatic hydrocarbons; and carbonates such as propylene carbonate, ethylene carbonate and dimethyl and diethyl carbonates; and mixtures thereof.

Preferably, this or these solvent compound(s) has (have) the property of dissolving the other ingredients of the ink, in particular the binder, the dyestuffs, the additives, etc.

The alcohols will preferably be chosen from linear or branched aliphatic alcohols having from 1 to 8 carbon atoms, such as methanol, ethanol, 1-propanol, 2-propanol, n-butanol, 2-butanol, tert-butanol, etc.

The ketones will preferably be chosen from ketones having from 3 to 10 carbon atoms, such as acetone, butanone(methyl ethyl ketone), 2-pentanone(methyl propyl ketone), 3-methyl-2-butanone(methyl isopropyl ketone) and 4-methyl-2-pentanone(methyl isobutyl ketone).

The alkylene glycol ethers are preferably chosen from monoalkyl ($C_1$ to $C_6$ alkyl group) or dialkyl ($C_1$ to $C_6$ alkyl groups) ethers of alkylene glycols comprising 1 to 10 carbon atoms in the alkylene chain; they are preferably ethylene glycol ethers or propylene glycol ethers, such as methoxypropanol.

The glycol esters and the glycol ether esters are preferably chosen from the esters thereof with saturated aliphatic carboxylic acids having from 1 to 6 carbon atoms, such as formic acid, acetic acid, propionic acid, butyric acid, valeric acid and caproic acid.

Mention may, for example, be made of methoxypropyl acetate, butyldiglycol acetate, etc.

The esters are preferably chosen from low molecular weight esters such as formates, acetates, propionates or butyrates of alcohols containing from 1 to 10 carbons.

The acetals are preferably chosen from low molecular weight acetals such as ethylal and methylal.

The ethers are preferably chosen from low molecular weight ethers such as dioxolane and tetrahydrofuran.

According to the invention, the solvent comprises a majority as % by weight relative to the total weight of the solvent of one or more solvent compound(s), the dielectric constant of which is less than 15, such as dioxolane, ethyl acetate or isopropyl acetate.

Those skilled in the art will be able to readily identify, among all the solvent compounds mentioned in the present description, including in the description of the prior art, the solvent compounds that satisfy the condition relating to the dielectric constant mentioned above.

The term "majority" is intended to mean that the % by weight of said solvent compound(s) is 50% or more of the total weight of the solvent, preferably 60% or more, more preferably 70% or more.

By virtue of the complexing compound included in the ink compositions of the invention, it is possible, for the first time, to formulate ink compositions for continuous deviated jet printing in which the solvent consists predominantly of solvent compound(s) having a low dielectric constant, which is (are) relatively non-dissociating, which was impossible and prohibited in the prior art.

As a result, it is possible, with the ink compositions according to the invention, to take advantage of all the advantageous properties of such solvents that could not be exploited previously, since the solvents of ink compositions had to consist predominantly of solvent compounds having a dielectric constant of greater than 15.

The ink composition according to the invention can also comprise a binder comprising one or more polymer(s) and/or resin(s).

This or these polymer(s) and/or resin(s) is (are) preferably chosen from (meth)acrylic resins, vinyl resins, ketone resins, phenolic resins, cellulose-based resins, styrene resins, epoxy resins, polyurethanes, styrene-acrylates, and combinations of two or more thereof.

Examples of these resins are as follows:

For the acrylic resins, methacrylic resins and styrene-acrylate resins, Joncryl® products from the company JOHNSON POLYMER, Acryloid® products from the company ROHM & HAAS, SMA® products from the company ATOCHEM or Neocryl® products from ZENECA.

For the vinyl resins, Hostaflex® products from the company VIANOVA, Vinylite® products from UNION CARBIDE or Vinnol® products from WACKER.

For the ketone resins, the products proposed by the companies HULS and BASF, such as the resins referred to as AP and SK from HULS and the LAROPAL® resins from BASF.

For the phenolic resins, the products provided by the company VIANOVA under the name ALNOVOL®.

Among the cellulose-based resins, such as nitrocelluloses, ethylcelluloses, cellulose acetopropionates or cellulose acetobutyrates, mention may, for example, by made of the products provided by the companies Aqualon or EASTMAN.

Among the epoxy resins, mention may be made of Epikote® products provided by the company SHELL or Araldite products from CIBA.

Among the polyurethanes, mention may be made of Surkopak® products from the company MITCHANOL.

The proportion of binder in the ink composition according to the invention is generally from 0.1% to 30% by weight, preferably from 1% to 25% by weight, more preferably from 3% to 20% by weight.

The ink composition can also comprise one or more plasticizer(s) (of the resin(s) or polymer(s) of the binder) chosen, for example, from the plasticizers known to those skilled in the art and chosen according to the binder used comprising one or more polymer(s) and/or resin(s); as plasticizer, mention may, for example, be made of thermoplastic polyurethanes.

By virtue of the great variety of choice of possible solvents with the compositions of the invention, such plasticizer compounds can be readily incorporated into the composition of the invention by choosing the suitable solvent(s).

The plasticizer(s) is (are) generally present in a proportion of 0.1% to 20% by weight.

According to the invention, the ink composition comprises at least one noncolored compound that can be dissociated into at least one anion and at least one cation. Said noncolored compound(s) is (are) preferably chosen from the conductivity salts, but the noncolored compound that can be dissociated can also be chosen from all the other compounds that satisfy this condition and that can go to make up the ink composition, such as anticorrosive agents. The ink may contain any combination of these noncolored compounds: for example, a conductivity salt and an anticorrosive agent.

Furthermore, the ink composition can comprise one or more dyes and pigments.

These dyes and/or pigments can be chosen from the dyes and/or pigments which can be dissociated into at least one anion and at least one cation, and/or from the dyes and/or pigments which cannot be dissociated into at least one anion and at least one cation.

The dye(s) and/or pigment(s) can be chosen from all the dyes or pigments suitable for the desired use, known to those skilled in the art; some of these pigments or dyes have already been cited above, in particular in the context of the description of the prior art.

Among these dyes and/or pigments, those skilled in the art will readily identify those which can be dissociated and those which cannot be dissociated.

The dyes and pigments will generally be chosen from the dyes and pigments known under the name "C.I. Solvent Dyes" and "C.I. Pigments".

By way of example, of the most common pigments and dyes, mention may be made of C.I. Solvent Black 29, C.I. Solvent Black 7, C.I. Solvent Black 28, C.I. Solvent Black 35, C.I. Solvent Blue 70, C.I. Solvent Red 124, and dispersions of Pigment Blue 60 or of Pigment Blue 15.

The total amount of dye(s) and/or of pigment(s) (including both the dyes and pigments that can be dissociated and the dyes and/or pigments that cannot be dissociated) is generally from 0.05% to 25% by weight, preferably from 1% to 20%, more preferably from 3% to 10% of the composition.

Again, by virtue of the great variety of solvents that can be included in the ink composition according to the invention, it is possible to choose these solvents such that they can dissolve the dye(s), and in particular the most water-resistant dyes, in a greater amount than the usual solvents; it is in particular possible, in the case of a fluorescent dye, to obtain particularly fluorescent inks, i.e. inks that are visible under weak UV lighting.

The composition according to the invention must also generally comprise at least one conductivity salt, unless another noncolored ingredient is itself a salt that can provide the conductivity when it is dissociated.

In fact, since the ink according to the invention can be applied by continuous jet, it must have a sufficient electrical conductivity, generally greater than 300 µS/cm at 20° C., preferably of the order of 500 to 2000 µS/cm (at 20° C.), or more.

The completing compound promotes the conductivity by aiding, through the complexation, the dissociation of the ions contained in the ink and, as a result, the amounts of conductivity salts (see below) can be reduced.

The products that provide the ink with the necessary conductivity for the continuous jet spraying are ionizable compounds, compounds that can be dissociated into at least one cation and at least one anion, such as salts.

According to the invention, the ink contains at least one noncolored compound (b) that can be dissociated into at least one cation and at least one anion. The dyes or other compounds, already present in the ink, can thus provide the latter with conductivity, in addition to the noncolored compound that can be dissociated, mentioned above. As regards the dyes: it is the case of the compounds known under the name "C.I. Solvent Black 27, 29, 35 and 45", already mentioned.

Said noncolored compound that can be dissociated into at least one anion and at least one cation is generally chosen from the conductivity salts different from the dyes and from the other compounds that can be dissociated, and is generally chosen from salts of alkali metals such as lithium, sodium or potassium, salts of alkaline earth metals such as magnesium and calcium, and simple or quaternary ammonium salts; in the form of halides (chlorides, bromides, iodides, fluorides), of perchlorates, of nitrates, thiocyanates, formates, acetates, sulfates, propionates, trifluoroacetates, triflates (trifluoromethanesulfonates), hexafluorophosphates, hexafluoro-antimonates, tetrafluoroborates, picrates, carboxylates and sulfonates. Reference may also be made to the list of these compounds already given in the context of the description of the prior art in relation to the documents which are cited therein.

These conductivity salts will therefore be present, if necessary (if the noncolored compound, which would then be other than a conductivity salt already present in the ink, did not provide, with the other possible compounds that can be dissociated, the desired conductivity), in the ink composition in such a way as to give the ink the conductivity above: preferably, the amount thereof is from 0.1 to 20% by weight, more preferably from 0.1% to 10% by weight, and better still from 0.1% to 5% by weight.

The molar ratio between the compound(s) that can be dissociated, whatever they are: (i.e., preferably, the dye(s) that can be dissociated and/or the conductivity salt(s), and the complexing compound(s) is generally from 0.1 to 10, preferably from 0.5 to 2.

It has been noted, however, that the increase in solubility and the increase in conductivity were at a maximum when the number of moles of the compound(s) that can be dissociated (for example, conductivity salt) and the complexing compound(s) were equal or very similar.

The composition according to the invention can also comprise one or more additives chosen from compounds which improve the solubility of some of these components, the printing quality, the adhesion, or else the control of the wetting of the ink on various supports.

The additive(s) may be chosen, for example, from antifoaming agents, chemical stabilizers, UV stabilizers; surfactants, such as Fluorad® FC 430, agents that stabilize salt corrosion, bactericides, fungicides and biocides, pH-regulating buffers, etc.

The additive(s) is (are) used at very low doses, in general less than or equal to 5% and sometimes as low as 0.01%, depending on whether they are antifoaming agents, stabilizers or surfactants.

A subject of the invention is also a process for marking objects, for example porous or nonporous objects, by jetting (spraying) an ink composition, as has been described above, onto objects. The marking is carried out by the continuous deviated jet technique.

A subject of the invention is also a substrate or support, for example a porous or nonporous substrate or support, provided with marking obtained by drying the ink composition, as described above.

This substrate can be made of metal, for example of aluminum, of steel (cans of drink), of glass (glass bottles), of ceramic, of a material containing cellulose, such as paper, cardboard or wood, of synthetic polymer ("plastic"), such as PVC or PET, of polyolefins, such as polyethylene (PE) or polypropylene (PP), of "Plexiglas", of any other nonporous or porous substance, or of a composite of several of the above materials.

Markings and printings of excellent quality are obtained on all substrates, even those which are barely porous.

The invention will be understood more clearly upon reading the following description of embodiments of the invention, given by way of illustrative and nonlimiting examples.

EXAMPLES

Example 1

Potassium acetate at 0.5% by mass is not completely soluble in a 90/10 mixture of dioxolane and ethanol, and the electrical conductivity of this mixture is only 7 µS/cm.

The addition of 1.34% by mass of a crown ether such as 11,4,7,10,13,16-hexaoxacyclooctadecane completely solubilizes potassium acetate and increases the conductivity up to 360 µS/cm, i.e. an increase by a factor of more than 50!.

Example 2

Potassium hexafluorophosphate at 0.5% by mass in dioxolane has a conductivity of 5 µS/cm.

The addition, in accordance with the invention, of 2% by mass of polyethylene glycol dimethyl ether having a molar mass of 1000 increases the conductivity up to more than 300 µS/cm, i.e. an increase by a factor of 60.

Examples 3 to 8

The following ink compositions according to the invention were prepared by mixing the products mentioned in Table I below, in the proportions indicated. The viscosities and the conductivities of the inks obtained are also given below.

TABLE I

|  | Dielectric constant | Examples (percentages by mass) | | | | | | |
|---|---|---|---|---|---|---|---|---|
|  |  | N° 3 | N° 4 | N° 5 | N° 6 | N° 7 | N° 8 | N° 9 |
| 99% Ethanol | 24.3 |  |  | 7.31 |  | 4.35 |  |  |
| Methyl ethyl ketone | 18.5 |  |  |  |  |  | 8 | 7 |
| N-Methylpyrrolidone | 33 |  | 4.53 |  | 4.52 | 4.35 |  |  |
| Dioxolane | 7.13 | 86.17 | 85.47 | 65.69 | 85.68 | 79.5 | 71.9 | 79.9 |
| Solvent black 3 |  |  |  | 4 |  | 4 |  |  |
| Fluorescent brightener (Uvitex OB from Ciba) |  |  |  |  |  |  | 1 |  |
| Vinyl dispersion of Pigment Blue 60 |  |  | 4 |  |  |  |  |  |
| Solvent Black 29 (Neozapon X55 from BASF) |  | 5 |  |  |  |  |  | 5 |
| Acrylic dispersion of Pigment Black 7 |  |  |  |  | 4 |  |  |  |
| Acrylic resin (Joncryl 67 from Johnson Polymer) |  |  |  |  |  |  |  | 15 |

TABLE I-continued

| | Dielectric constant | Examples (percentages by mass) | | | | | | |
|---|---|---|---|---|---|---|---|---|
| | | N° 3 | N° 4 | N° 5 | N° 6 | N° 7 | N° 8 | N° 9 |
| Vinyl resin (Hostaflex CM151 from Solutia) | | | 3 | | 3 | | | |
| Phenolic resin of novolac type (Alnovol PN320 from Solutia) | | | | 20 | | | | |
| Nitrocellulose wetted with 30% of isopropanol (H27 from Haguedorn) | | 6 | | | | 5 | | 6 |
| Potassium trifluoroacetate | | 1 | | | 1 | 1 | | 1 |
| Potassium hexafluorophosphate | | | 1.5 | 1.5 | | | 1 | |
| Crown ether 18-crown-6 | | 1.73 | 1.4 | 1.4 | 1.7 | 1.7 | | 1 |
| PEGDME 500 | | | | | | | 3 | |
| Surfactant BYK 333 (poly-dimethylsiloxane modified polyether) | | 0.1 | 0.1 | 0.1 | 0.1 | 0.1 | 0.1 | 0.1 |
| Viscosity (mPa · s) | | 5.23 | 5.62 | 4.3 | 4.02 | 3.78 | 4.3 | 5.2 |
| Conductivity (mS/cm) | | 786 | 675 | 266 | 444 | 700 | 568 | 476 |

PEGDME = polyethylene glycol dimethyl ether having a molar mass of approximately 500

The compositions prepared according to Examples 3 to 8 were filtered through filters with a porosity of 1 μm, and give inks that can be jetted (sprayed) by inkjet.

The inks thus prepared were tested in Imaje printers of Jaime 1000 Series 4 type which operate according to the continuous deviated jet principle.

The printings obtained were all of excellent quality.

The invention claimed is:

1. Ink composition for continuous deviated jet printing, which is liquid at ambient temperature, comprising:
   a) a solvent comprising one or more solvent compounds, said solvent having a weight % majority, based on the total weight of the solvent, composed of said one or more solvent compounds that each have a dielectric constant which is less than 15, said solvent representing at least 10% of the total weight of the ink composition;
   b) at least one noncolored compound which can be dissociated into at least one anion and at least one cation, said compound representing at least 0.1% by weight of the total weight of the ink composition;
   c) at least one compound that complexes said cation or said anion, representing at least 0.1% by weight of the total weight of the ink composition.

2. Ink composition according to claim 1, in which said at least one noncolored compound that can be dissociated is chosen from conductivity salts.

3. Ink composition according to either one of claims 1 and 2, further comprising:
   d) one or more dyes and/or pigments;
   e) a binder.

4. Composition according to claim 3, in which said one or more dyes, pigments and combinations thereof are chosen from dyes and/or pigments that can be dissociated into at least one anion and at least one cation.

5. Composition according to claim 3, in which said one or more dyes, pigments and combinations thereof are chosen from dyes and/or pigments that cannot be dissociated into at least one anion and at least one cation.

6. Ink composition according to claim 1, in which said complexing compound is selected from the group consisting of polyethylene glycol dimethyl ethers or glymes, propylene glycol dimethyl ethers and polypropylene glycol dimethyl ethers, crown ethers, lariats, cryptands, spherands, hemispherands, cyclodextrins, and mixtures thereof.

7. Ink composition according to claim 6, in which the glymes are selected from the group consisting of glymes of mass greater than or equal to that of tetraglyme or tetraethylene glycol dimethyl ether.

8. Ink composition according to claim 6, in which the polypropylene glycol dimethyl ethers are selected from the group consisting of ethers of mass greater than or equal to that of tetrapropylene glycol dimethyl ether.

9. Ink composition according to claim 6, in which the crown ethers are selected from the group consisting of 1,4,7,10-tetraoxacyclododecane or 12-crown-4, 1,4,7,10,13-pentaoxacyclopentadecane or 15-crown-5, 1,4,7,10,13,16-hexaoxacyclooctadecane or 18-crown-6, benzo-12-crown-4, benzo-15-crown-5, benzo-18-crown-6, polydibenzo-18-crown-6, cyclohexano-15-crown-5, cyclohexano-18-crown-6, dibenzo-15-crown-5, dibenzo-18-crown-6, dibenzo-21-crown-7, dibenzo-24-crown-8, dibenzo-30-crown-10, dicyclohexano-18-crown-6, 2-hydroxymethyl-12-crown-4, 2-hydroxymethyl-15-crown-5, 2-hydroxymethyl-18-crown-6, 7,16-dibenzyl-1,4,10,13-tetraoxa-7,16-diazacyclooctadecane, 1,4,10-trioxa-7,13-diazacyclopentadecane, 4'-aminobenzo-15-crown-5, 4'-aminobenzo-18-crown-6, 4'-aminodibenzo-18-crown-6, 2-aminomethyl-15-crown-5, 2-aminomethyl-18-crown-6, 4'-amino-5'-nitrobenzo-15-crown-5, 1-aza-12-crown-4, and mixtures thereof.

10. Ink composition according to claim 6, in which the cryptands are selected from the group consisting of 4,7,13,16,21,24-hexaoxa-1,10-diazabicyclo[8.8.8]-hexacosane or Cryptand 222, 4,7,13,16,21-pentaoxa-1,10-diazabicyclo[8.8.5]tricosane or Cryptand 221, 4,7,13,18-tetraoxa-1,10-diazabicyclo[8.5.5]eicosane or Cryptand 211, and mixtures thereof.

11. Ink composition according to claim 6, in which the cyclodextrins are selected from the group consisting of α-, β-, or γ-cyclodextrins, derivatives thereof and mixtures thereof.

12. Composition according to claim 1, comprising less than 10% by weight of water.

13. Composition according to claim 1, in which the solvent represents from 30% to 90% by weight of the total weight of the ink composition.

14. Composition according to claim 1, in which the solvent comprises one or more organic solvent compounds and, optionally, water.

15. Ink composition according to claim 14, in which said one or more organic solvent compounds and combinations thereof are selected from the group consisting of alcohols; ketones; alkylene glycol ethers; alkylene glycol esters and alkylene glycol ether esters such as acetates; dimethylformamide; N-methylpyrrolidone; ethers; acetals; esters; cyclic or noncyclic, aliphatic hydrocarbons; aromatic or nonaromatic hydrocarbons; and carbonates such as propylene carbonate, ethylene carbonate and dimethyl and diethyl carbonates, and mixtures thereof.

16. Composition according to claim 15, in which said one or more organic solvent compounds and combinations thereof are selected from the group consisting of linear or branched aliphatic alcohols containing from 1 to 8 carbon atoms; ketones containing from 3 to 10 carbon atoms; monoalkyl ($C_1$ to $C_6$ alkyl group) or dialkyl ($C_1$ to $C_6$ alkyl groups) ethers of alkylene glycols comprising 1 to 10 carbon atoms in the alkylene chain, such as ethylene glycol and propylene glycol; alkylene glycol esters and alkylene glycol ether esters with saturated aliphatic carboxylic acids containing from 1 to 6 carbon atoms.

17. Ink composition according to claim 3, in which the binder comprises one or more resin(s) and/or polymer(s).

18. Ink composition according to claim 17, in which said one or more resins, polymers and combinations thereof are selected from the group consisting of (meth)acrylic resins, vinyl resins, ketone resins, phenolic resins, cellulosic resins, styrene resins, epoxy resins, polyurethanes, styrene-acrylates, and combinations of two or more thereof.

19. Ink composition according to claim 3, comprising from 0.1% to 30% by weight of binder.

20. Ink composition according to claim 1, also comprising one or more plasticizer(s) in a proportion of 0.1% to 20% by weight.

21. Ink composition according to claim 3, in which said one or more dyes, pigments and combinations thereof are selected from the group consisting of the dyes and pigments known under the name "C.I. Solvent Dyes" and "C.I. Pigments".

22. Composition according to claim 3, comprising from 0.05% to 25% by weight of dye(s) and/or pigment(s) by weight.

23. Composition according to claim 2, in which the conductivity salt represents from 0.1% to 20% by weight of the total weight of the ink.

24. Ink composition according to claim 23, in which said conductivity salt is selected from the group consisting of alkali metal salts, alkaline earth metal salts and simple or quaternary ammonium salts, in the form of halides, perchlorates, nitrates, thiocyanates, formates, acetates, sulfates, propionates, trifluoroacetates, triflates, hexafluoro-phosphates, hexafluoroantimonates, tetrafluoroborates, picrates, carboxylates and sulfonates.

25. Ink composition according to claim 1, which has a conductivity of greater than 300 µS/cm at 20° C.

26. Composition according to claim 1, in which the molar ratio between the salt or the compound(s) that can be dissociated and the complexing compound(s) is from 0.1 to 10.

27. Composition according to claim 26, in which the number of moles of the compound(s) that can be dissociated and of the complexing compound(s) are equal or very similar.

28. Ink composition according to claim 1, further comprising one or more additive(s) selected from the group consisting of antifoaming agents, chemical stabilizers, UV stabilizers, surfactants, agents that inhibit salt corrosion; bactericides, fungicides and biocides, and pH-regulating buffers.

29. Process for marking objects by jetting an ink onto these objects by the continuous deviated jet technique, characterized in that the ink jetted is an ink composition according to claim 1.

30. Substrate characterized in that it is provided with a marking obtained by drying the ink composition according to claim 1.

31. Substrate according to claim 30, characterized in that the substrate is made of metal, glass, ceramic, material containing cellulose, synthetic polymer, or a composite of several of the above materials.

32. Ink composition according to claim 1, wherein said solvent consists essentially of said one or more solvent compounds.

33. Ink composition according to claim 1, wherein said solvent consists of said one or more solvent compounds.

34. Ink composition for continuous deviated jet printing, which is liquid at ambient temperature, consisting essentially of:
  a) a solvent comprising one or more solvent compounds, said solvent having a weight % majority, based on the total weight of said solvent, composed of said one or more solvent compounds that each have a dielectric constant which is less than 15, said solvent representing at least 10% of the total weight of the ink composition;
  b) at least one noncolored compound which can be dissociated into at least one anion and at least one cation, said compound representing at least 0.1% by weight of the total weight of the ink composition;
  c) at least one compound that complexes said cation or said anion, representing at least 0.1% by weight of the total weight of the ink composition.

35. Ink composition according to claim 34, wherein said solvent consists essentially of said one or more solvent compounds.

36. Ink composition according to claim 3, in which said one or more dyes, pigments and combinations thereof are selected from the group consisting of C.I. Solvent Black 29, C.I. Solvent Black 7, C.I. Solvent Black 28, C.I. Solvent Black 27, 35, and 45, C.I. Solvent Blue 70, C.I. Solvent Red 124, Pigment Blue 60 dispersion or Pigment Blue 15 dispersion.

37. Ink composition according to claim 30, wherein the substrate is made of a material selected from the group consisting of aluminum, steel, paper, coated paper, glazed paper, cardboard, wood, polyvinyl chloride, polyethylene terephthalate, polypropylene, poly(methyl methacrylate), or a composite of several of the above materials.

* * * * *

UNITED STATES PATENT AND TRADEMARK OFFICE
CERTIFICATE OF CORRECTION

| | |
|---|---|
| PATENT NO. | : 7,833,334 B2 |
| APPLICATION NO. | : 11/378041 |
| DATED | : November 16, 2010 |
| INVENTOR(S) | : Pierre de Saint-Romain |

It is certified that error appears in the above-identified patent and that said Letters Patent is hereby corrected as shown below:

On the Title page, Item (73) Assignee:

Change "Marken-Imaje" to --Markem-Imaje--.

Signed and Sealed this
Twenty-first Day of June, 2011

David J. Kappos
*Director of the United States Patent and Trademark Office*